United States Patent
Matthews, III et al.

(10) Patent No.: US 7,665,109 B2
(45) Date of Patent: *Feb. 16, 2010

(54) ELECTRONIC PROGRAM GUIDE WITH HYPERLINKS TO TARGET RESOURCES

(75) Inventors: Joseph H. Matthews, III, Redmond, WA (US); Frank Lawler, Seattle, WA (US); James O. Robarts, Redmond, WA (US); David S. Byrne, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

This patent is subject to a terminal disclaimer.

(21) Appl. No.: 10/620,254

(22) Filed: Jul. 15, 2003

(65) Prior Publication Data

US 2004/0139465 A1 Jul. 15, 2004

Related U.S. Application Data

(63) Continuation of application No. 09/184,840, filed on Nov. 2, 1998, now Pat. No. 6,631,523, which is a continuation of application No. 08/623,611, filed on Mar. 29, 1996, now Pat. No. 6,025,837.

(51) Int. Cl.
*G06F 3/00* (2006.01)
*G06F 13/00* (2006.01)
*H04N 5/445* (2006.01)
*H04N 7/173* (2006.01)

(52) U.S. Cl. ............ 725/51; 725/61; 725/60; 725/53; 725/46; 725/109; 715/760

(58) Field of Classification Search .......... 348/473, 348/563; 725/51, 53, 46, 60, 61, 109; 715/760
See application file for complete search history.

(56) References Cited

U.S. PATENT DOCUMENTS 4,081,754 A 3/1978 Jackson
(Continued)

FOREIGN PATENT DOCUMENTS

EP 0128481 (A2) 12/1984
(Continued)

OTHER PUBLICATIONS

PR Newswire, "Iguide Debuts TV Guide Online Centerpiece", Mar. 1996, 1 page.
(Continued)

*Primary Examiner*—Hoang-Vu A Nguyen-Ba
(74) *Attorney, Agent, or Firm*—Lee & Hayes, PLLC

(57) ABSTRACT

An electronic programming guide (EPG) resides in a user interface unit memory and is executable on the processor of the user interface unit to organize programming information that is descriptive of the programs supplied over an interactive entertainment system. The EPG supports a user interface (UI) which visually correlates programs titles to scheduled viewing times. A hyperlink browser also resides in memory and is executable on the processor. One or more hyperlinks, which reference target resources containing interactive content related to the video programs, are integrated as part of the EPG UI. When a viewer activates a hyperlink within the EPG, the user interface unit launches the browser to activate the target resource specified by the hyperlink. The instruction might cause the visual display unit to tune to the program or channel represented by the particular label, or to initiate procedures to record the program when it begins playing, or to jump to a related target resource, such as a Web site.

6 Claims, 8 Drawing Sheets

U.S. PATENT DOCUMENTS

| | | | |
|---|---|---|---|
| 4,203,130 A | 5/1980 | Doumit et al. | |
| 4,228,543 A | 10/1980 | Jackson | |
| 4,694,490 A | 9/1987 | Harvey et al. | |
| 4,704,725 A | 11/1987 | Harvey et al. | |
| 4,706,121 A | 11/1987 | Young | |
| 4,751,578 A | 6/1988 | Reiter et al. | |
| 4,908,713 A | 3/1990 | Levine | |
| 4,977,455 A | 12/1990 | Young | |
| 5,038,211 A | 8/1991 | Hallenbeck | |
| 5,047,867 A * | 9/1991 | Strubbe et al. | 386/83 |
| 5,068,734 A | 11/1991 | Beery | |
| 5,151,789 A | 9/1992 | Young | |
| 5,223,924 A * | 6/1993 | Strubbe | 725/46 |
| 5,233,654 A | 8/1993 | Harvey et al. | |
| 5,307,173 A | 4/1994 | Yuen et al. | |
| 5,335,079 A | 8/1994 | Yuen et al. | |
| 5,335,277 A | 8/1994 | Harvey et al. | |
| 5,353,121 A | 10/1994 | Young et al. | |
| 5,382,983 A | 1/1995 | Kwoh et al. | |
| 5,394,163 A | 2/1995 | Bullen et al. | |
| 5,410,344 A | 4/1995 | Graves et al. | |
| 5,469,206 A * | 11/1995 | Strubbe et al. | 725/60 |
| 5,479,266 A | 12/1995 | Young et al. | |
| 5,479,268 A | 12/1995 | Young et al. | |
| 5,483,278 A * | 1/1996 | Strubbe et al. | 725/61 |
| 5,524,193 A | 6/1996 | Covington et al. | |
| 5,532,754 A | 7/1996 | Young et al. | |
| 5,534,911 A | 7/1996 | Levitan | |
| 5,541,662 A | 7/1996 | Adams et al. | |
| 5,552,833 A | 9/1996 | Henmi et al. | |
| 5,559,549 A | 9/1996 | Hendricks et al. | |
| 5,563,648 A | 10/1996 | Menand et al. | |
| 5,570,126 A | 10/1996 | Blahut et al. | |
| 5,572,643 A | 11/1996 | Judson | |
| 5,583,560 A | 12/1996 | Florin et al. | |
| 5,583,576 A | 12/1996 | Perlman et al. | |
| 5,585,865 A | 12/1996 | Amano et al. | |
| 5,585,866 A | 12/1996 | Miller et al. | |
| 5,589,892 A * | 12/1996 | Knee et al. | 725/43 |
| 5,594,228 A | 1/1997 | Swartz et al. | |
| 5,594,509 A | 1/1997 | Florin et al. | |
| 5,604,542 A | 2/1997 | Dedrick | |
| 5,606,691 A | 2/1997 | Watts et al. | |
| 5,617,565 A | 4/1997 | Augenbraun et al. | |
| 5,623,613 A | 4/1997 | Rowe et al. | |
| 5,629,733 A | 5/1997 | Youman et al. | |
| 5,635,989 A | 6/1997 | Rothmuller | |
| 5,657,091 A | 8/1997 | Bertram | |
| 5,675,390 A | 10/1997 | Schindler et al. | |
| 5,682,511 A | 10/1997 | Sposato et al. | |
| 5,686,954 A | 11/1997 | Yoshinobu et al. | |
| 5,687,331 A | 11/1997 | Volk et al. | |
| 5,689,799 A | 11/1997 | Dougherty et al. | |
| 5,692,214 A | 11/1997 | Levine | |
| 5,694,163 A | 12/1997 | Harrison | |
| 5,694,546 A | 12/1997 | Reisman | |
| 5,708,845 A | 1/1998 | Wistendahl et al. | |
| 5,710,887 A | 1/1998 | Chelliah et al. | |
| 5,724,424 A | 3/1998 | Gifford | |
| 5,727,065 A | 3/1998 | Dillon | |
| 5,734,413 A | 3/1998 | Lappington et al. | |
| 5,737,560 A | 4/1998 | Yohanan | |
| 5,751,282 A | 5/1998 | Girard et al. | |
| 5,752,159 A | 5/1998 | Faust et al. | |
| 5,758,259 A | 5/1998 | Lawler | |
| 5,761,606 A | 6/1998 | Wolzien | |
| 5,774,664 A | 6/1998 | Hidary et al. | |
| 5,774,666 A | 6/1998 | Portuesi | |
| 5,778,181 A | 7/1998 | Hidary et al. | |
| 5,781,189 A | 7/1998 | Holleran et al. | |
| 5,781,228 A | 7/1998 | Sposato | |
| 5,781,246 A | 7/1998 | Alten et al. | |
| 5,801,747 A | 9/1998 | Bedard | |
| 5,805,806 A | 9/1998 | McArthur | |
| 5,818,441 A * | 10/1998 | Throckmorton et al. | 725/110 |
| 5,818,935 A | 10/1998 | Maa | |
| 5,828,419 A | 10/1998 | Bruette et al. | |
| 5,838,906 A | 11/1998 | Doyle et al. | |
| 5,845,303 A | 12/1998 | Templeman | |
| 5,848,352 A | 12/1998 | Dougherty et al. | |
| 5,860,073 A | 1/1999 | Ferrel et al. | |
| 5,861,881 A | 1/1999 | Freeman et al. | |
| 5,867,226 A | 2/1999 | Wehmeyer et al. | |
| 5,873,080 A | 2/1999 | Coden et al. | |
| 5,878,233 A | 3/1999 | Schloss | |
| 5,883,677 A | 3/1999 | Hofmann | |
| 5,884,056 A | 3/1999 | Steele | |
| 5,892,508 A | 4/1999 | Howe et al. | |
| 5,905,865 A | 5/1999 | Palmer et al. | |
| 5,907,321 A | 5/1999 | Grossman et al. | |
| 5,907,837 A | 5/1999 | Ferrel et al. | |
| 5,918,012 A | 6/1999 | Astiz et al. | |
| 5,953,046 A | 9/1999 | Pocock | |
| 5,978,817 A | 11/1999 | Giannandrea et al. | |
| 6,005,565 A | 12/1999 | Legall et al. | |
| 6,006,257 A | 12/1999 | Slezak | |
| 6,025,837 A * | 2/2000 | Matthews et al. | 725/110 |
| 6,133,909 A | 10/2000 | Schein et al. | |
| 6,177,931 B1 | 1/2001 | Alexander et al. | |
| 6,216,264 B1 | 4/2001 | Maze et al. | |
| 6,240,555 B1 * | 5/2001 | Shoff et al. | 725/110 |
| 6,305,020 B1 | 10/2001 | Hoarty et al. | |
| 6,486,895 B1 | 11/2002 | Robertson et al. | |
| 6,631,523 B1 * | 10/2003 | Matthews et al. | 725/53 |
| 6,668,377 B1 | 12/2003 | Dunn | |
| 6,963,906 B2 | 11/2005 | Portuesi | |
| 2003/0084444 A1 * | 5/2003 | Ullman et al. | 725/40 |
| 2003/0101232 A1 | 5/2003 | Ullman et al. | |
| 2007/0220107 A1 | 9/2007 | Reisman | |
| 2008/0235725 A1 | 9/2008 | Hendricks | |

FOREIGN PATENT DOCUMENTS

| | | |
|---|---|---|
| EP | 0572090 (A2) | 12/1993 |
| EP | 0 705 036 A2 | 4/1996 |
| EP | 0 721 253 A2 | 7/1996 |
| EP | 0 723 369 A1 | 7/1996 |
| EP | 0 735 749 A2 | 10/1996 |
| EP | 0 757 485 A2 | 2/1997 |
| EP | 0 758 833 A2 | 2/1997 |
| EP | 0 774 866 A2 | 5/1997 |
| EP | 0 774 868 A1 | 5/1997 |
| EP | 0 758 833 A3 | 10/1997 |
| EP | 0 854 645 A2 | 7/1998 |
| JP | 63211010 | 9/1988 |
| JP | 2093767 (A) | 4/1990 |
| JP | 5089173 (A) | 4/1993 |
| JP | 06124309 | 5/1994 |
| JP | 6507037 | 8/1994 |
| JP | 6276501 (A) | 9/1994 |
| JP | 0773243 | 3/1995 |
| JP | 7160732 | 6/1995 |
| JP | 06216168 | 9/1995 |
| JP | 7297796 A | 11/1995 |
| JP | 7303216 | 11/1995 |
| JP | 7303216 A | 11/1995 |
| JP | 8019063 A | 1/1996 |
| JP | 08051595 | 2/1996 |
| JP | 8249324 | 9/1996 |
| JP | 8275077 A | 10/1996 |
| JP | 8314920 | 11/1996 |
| JP | 07193666 | 2/1997 |
| JP | 9046689 | 2/1997 |
| JP | 9083888 A | 3/1997 |

| JP | 09203509 | 10/1998 |
| WO | WO 94/14284 | 6/1994 |
| WO | WO 96/17473 | 6/1996 |
| WO | WO9641470 | 12/1996 |
| WO | WO 97/02702 | 1/1997 |
| WO | WO 97/30546 | 8/1997 |
| WO | WO 97/46011 | 12/1997 |
| WO | WO 97/48230 | 12/1997 |
| WO | WO 98/43183 | 10/1998 |

OTHER PUBLICATIONS

Eric Schmuckler et al., "A marriage that's made in cyberspace. (television networks pursue links with online information services)", May 16, 1994, Mediaweek, 4 pages.

"Prodigy launches interactive TV listing", Apr. 22, 1994, Public Broadcasting Report, abstract.

"Prodigy offers total television online guide", Apr. 12, 1994, Media Daily, abstract.

"Prodigy launched interactive TV listing service on computer network", Apr. 12, 1994, Communications Daily, abstract.

Untitled Article, Apr. 18, 1994, Television Digest, abstract.

"Intercast Industry Group Web Page", retrieved from World Wide Web at web site URL www.intercast.org.

Mark Berniker, "TV Guide' going online", Broadcasting & Cable, Jun. 1994, 2 pages.

Robert Cowart, "Mastering Windows 3.1 Special Edition", 1993, pp. 84-87.

"HP Division Talks to Shops About Video Box", Voight et al., AdWeek Midwest, v XXXVI, n. 48, p. 34, Nov. 27, 1995.

"Writhing in the city of New Orleans", Burgi et al., Mediaweek, v4,n22, p. 20(4), May 30, 1994.

Connolly, Hypertext Markup Language—2.0, RFC 1866, Nov. 1995, MIT/W3C.

DiRosa, "Bigsurf Netguide", vol. 3.1, Jul. 1995, pp. 1-27.

Ehrmantraut, "The Personal Electronic Program Guide—Towards the Pre-Selection of Individual TV Programs" Proceedings of the International Conference on Information and Knowledge Management, CIKM ACM New York, Nov. 12, 1996, pp. 243-250.

Loeb, "Architecting Personalized Delivery of Multimedia Information" Journal of ACM Association for Computing Machinery New York, vol. 35, No. 12, Dec. 1992, pp. 39-48.

Shibano, Koji, "The SQL-92 Follow on and the SQL, Information Processing", Information Processing Society of Japan, Jul. 15, 1996, vol. 37, No. 7, pp. 616-622.

Kita, Mitsunari,"From the Scene of Using the Internet for Business/ The Internet TV Guide," Internet Magazine, No. 23, pp. 288-291, Impress, Inc., Japan, Dec. 1, 1996.

Japanese Notice of Rejection from JP Application No. 2005-370875, mailed on Aug. 12, 2008, 10 pp.

* cited by examiner

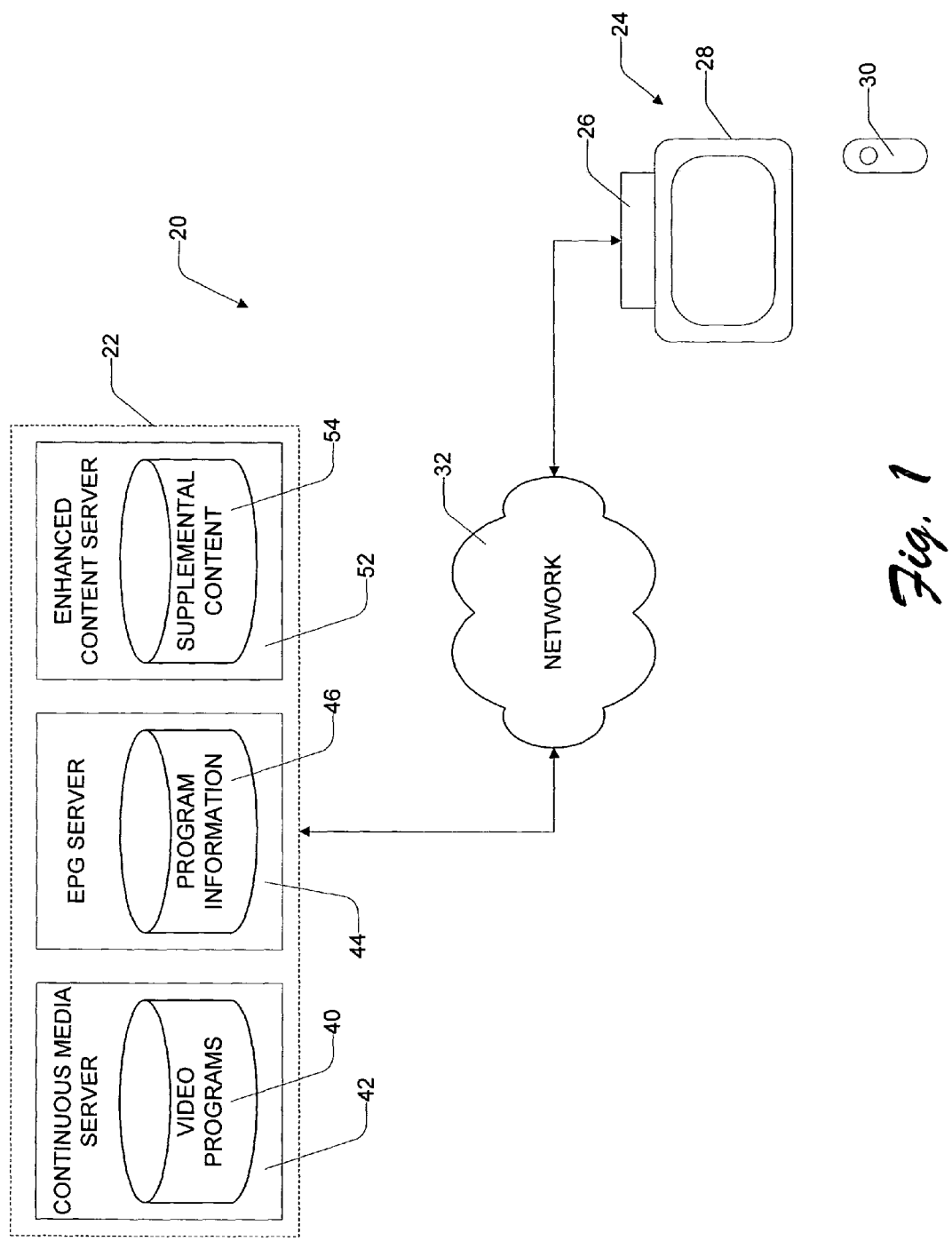

| STORAGE POINTER | TITLE | ACTOR | CC | STEREO | TIME | NETWORK | SUPPLEMENTAL CONTENT | DESCRIPTION |
|---|---|---|---|---|---|---|---|---|
| PROG1 | MURDER, SHE WROTE | LANDSBURY | YES | YES | 8:00 PM THURSDAY | CBS | CONTENT1 | "The Secret of Gila Junction" Jessica.... |
| PROG2 | SEINFELD | SEINFELD | YES | YES | 9:00 PM THURSDAY | NBC | http://www.nbc.com/seinfeld.html | "The Friars Club" Jerry tries... |
| PROG3 | STAR TREK NEXT GEN. | STEWART | YES | YES | 10:00 PM FRIDAY | FOX | http://www.fox.com/startrek.html http://www.collectiables.com/trekiecollectables.html | "Delta Vega" Picard is faced.... |

Fig. 2

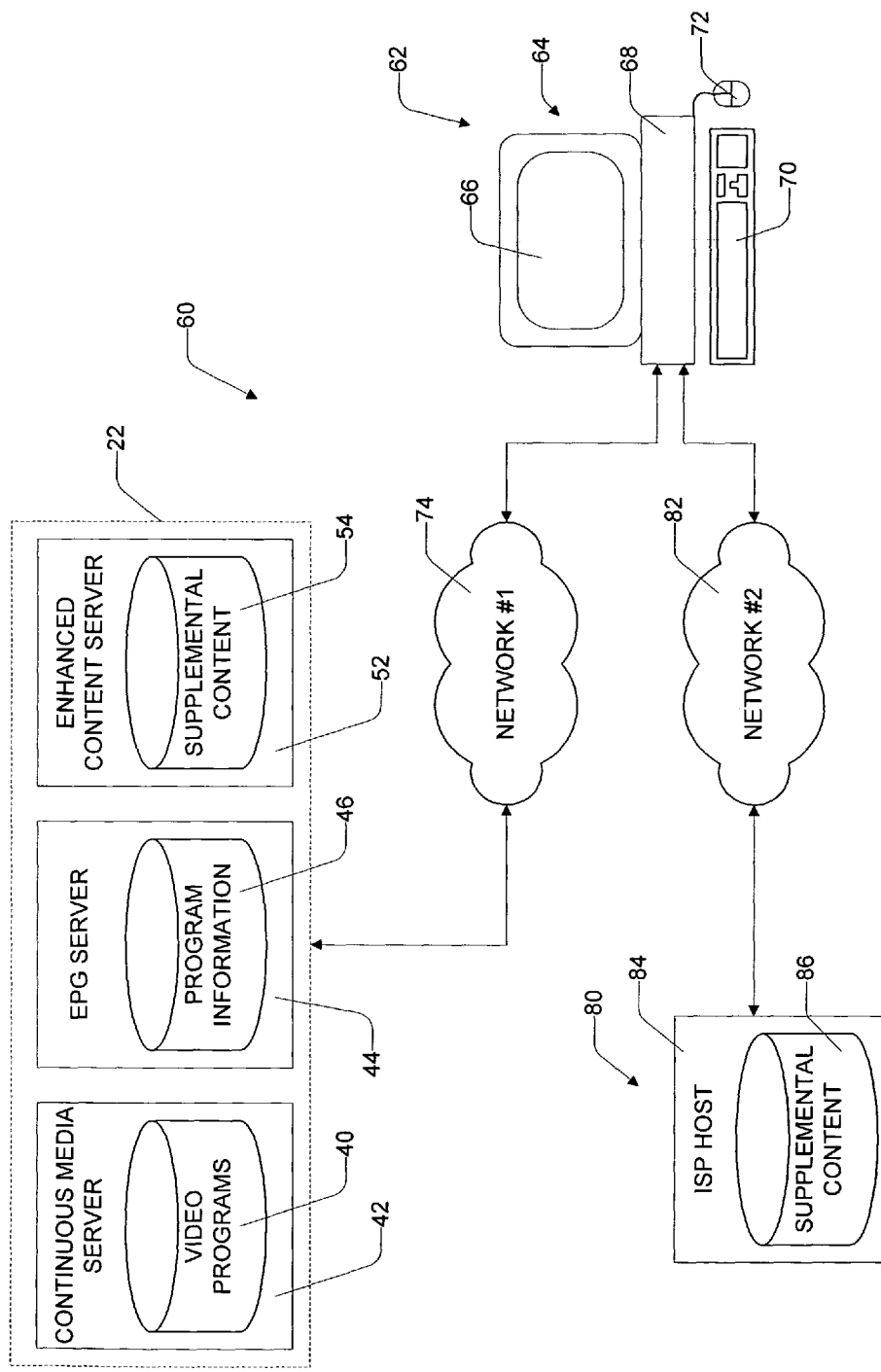

ELECTRONIC PROGRAM GUIDE WITH HYPERLINKS TO TARGET RESOURCES

RELATED APPLICATIONS

This is a continuation of U.S. patent application Ser. No. 09/184,840, filed Nov. 2, 1998, now U.S. Pat. No. 6,631,523, which is a continuation application of U.S. patent application Ser. No. 08/623,611, filed Mar. 29, 1996, now U.S. Pat. No. 6,025,837.

TECHNICAL FIELD

This invention relates to interactive entertainment systems, such as interactive television or interactive computing network systems, and to electronic program guides which operate in conjunction with these systems. More particularly, this invention relates to methods for using electronic programming guides to access supplemental hyperlink content which enables viewer interactivity with continuous video programs.

BACKGROUND OF THE INVENTION

Television viewers are very familiar with printed programming schedules that appear in daily newspapers or weekly magazines, such as TV Guide®. The printed program guide lists the various television shows in relation to their scheduled viewing time on a day-to-day basis.

Cable TV systems often include a channel with a video broadcast of the printed program guide. The cable channel is dedicated to displaying listings of programs available on the different available channels. The listings are commonly arranged in a grid. Each column of the grid represents a particular time slot, such as 4:00 p.m. to 4:30 p.m. Each row represents a particular broadcast or cable channel, such as ABC, PBS, or ESPN. The various scheduled programs or shows are arranged within the rows and columns, indicating the channels and times at which they can be found. The grid is continuously scrolled vertically so that a viewer can scan a continuously refreshing set of programs within three or four time slots.

Data regarding the available programs is typically received by a cable system as a plurality of data records. Each available program has a single corresponding data record indicating a variety of information about the program such as its channel, its starting and ending times, its title, names of starring actors, whether closed-captioning and stereo are available, and perhaps a brief description of the program. It is not difficult to format a grid such as described above from this type of data records. The grid is typically formatted once at the cable system's headend and broadcast repeatedly and continuously to the thousands of homes served by the cable system.

Newer, interactive cable distribution systems feature electronic program guides (EPGs) which function somewhat similar to the broadcast program listing channels described above. Rather than scrolling automatically, however, an EPG allows a viewer to use a remote control device to scroll as desired both horizontally and vertically through a program grid. This functionality utilizes the two-way communications capabilities of interactive cable systems.

The EPG is typically implemented in software which runs on a set-top box (STB) connected between a TV and a cable system home entry line. When scrolling to a new column or row, the set-top box inserts the appropriate programming information into each new row or column. This information is either cached at the STB, or requested from the cable system's headend.

Interactive systems permit viewers to control what programs are shown on their TV and when. Movies-on-demand is one example of this interactive control. A viewer can peruse a list of available movies from a menu or the EPG, and then order a selected movie. The STB sends a request for the movie to the headend server. The movie is retrieved and transmitted to the requesting STB. Movies-on-demand thus enables viewers to shop, purchase, and watch a movie at their convenience, as opposed to being restricted to certain start times as is typical with conventional premium or pay-per-view channels.

Many industry and commercial experts expect interactive TV systems to evolve to the point of offering many other interactive services to the consumers. For instance, consumers will be able to use their TV to shop for groceries or other goods, conduct banking and other financial transactions, play games, or attend educational courses and take exams.

There is a rapidly expanding interest in online services provided over public networks to home or business computers. Most notably, the Internet is emerging as a means for supplying video, sound, pictures, text, and other multimedia rich resources to a user's computer. Using the Internet, users can access a wide variety of resources that are maintained on many computers located around the world.

Resources available on the Internet are, most commonly presented as hypertext. "Hypertext," also referred to as "hypermedia," is a metaphor for presenting information in which text, images, sounds, and actions become linked together in a complex, non-sequential web of associations that permit a user to browse through related topics, regardless of the presented order of the topics. Hypermedia content is widely used for navigation and information dissemination on the "World-Wide Web" (WWW or Web) of the Internet. An application program referred to as a "Web browser" is normally used to retrieve and render hypermedia content from the WWW.

Hypermedia content is commonly organized as documents with embedded control information. The embedded control information includes formatting specifications, indicating how a document is to be rendered by the Web browser. In addition, such control information can include links or "hyperlinks," which are symbols or instructions telling the Web browser where to find other related WWW documents on the Internet. A hyperlink from one hypermedia topic to another is normally established by the author of a hypermedia document, although some applications allow users to insert hyperlinks to desired topics.

A hyperlink is typically rendered by a Web browser as a graphical icon or as highlighted keywords. A user "activates" or "follows" a hyperlink by clicking on or otherwise selecting the icon or highlighted keywords. Activating a link causes the Web browser to retrieve and render the document or resource that is targeted by the hyperlink.

Associated with a hyperlink's icon or highlighted keywords is an underlying target specification. The target specification is set forth in the underlying hypermedia document, but is normally invisible to the user. The target specification unambiguously identifies a targeted document or resource, typically specifying the name of the computer on which the document resides and the complete file name of the document. In WWW documents, targets are specified using "universal resource locators" (URLs). A URL describes everything about a particular resource that a Web browser needs to know to request and render it. The URL describes the protocol a browser should use to retrieve the resource, the name of the computer it is on, and the path and file name of the resource.

The following is an example of a URL:
HTTP://www.microsoft.com/upgrades

The "http://" portion of the URL describes the protocol. The letters "http" stand for HyperText Transfer Protocol, the set of rules that a browser will follow to request a document and the remote server will follow to supply the document. The "www.microsoft.com" portion of the URL is the name of the remote host computer which maintains the document. The last portion "/upgrades" is the path and file name of the document on the remote host computer.

Hypermedia content utilized by the WWW is commonly written using what is referred to as a "markup language." "SGML" (Standard Generalized Markup Language) is one such language, defined formally as "a language for document representation that formalizes markup and frees it of system and processing dependencies." SGML is a language for describing the structure of documents and for describing a tagging scheme to delineate that structure within text.

For creating hypermedia content, WWW documents utilize a subset of SGML called "HTML" (Hypertext Markup Language). An HTML textual document can be thought of as plain text that contains formatting instructions in the form of HTML markup codes or "tags." Tags tell Web browsers how to render and print documents, and are also used to specify hyperlinks.

The following is a simple example of a portion of an HTML document containing a single hyperlink:

Microsoft has a Web page with the latest <A HREF="HTTP://www.microsoft.com/upgrades"> upgrades</A> to its popular word processing program.

When rendered by a web browser, the word "upgrades" would appear highlighted and/or underlined to the user, and the text within the angled brackets would not appear at all, as follows:

Microsoft has a Web page with the latest upgrades to its popular word processing program.

By clicking on the highlighted keyword "upgrades," the user can instruct the Web browser to activate the underlying URL. In this case, the underlying URL is to an HTTP (hypertext) document located at host computer "www.microsoft.com," having the file name "upgrades."

The angled brackets in the example define hypertext tags. In most cases, tags occur in pairs: a start tag and an end tag. The start tag indicates where a particular formatting is to begin, and a corresponding end tag indicates where the formatting is to end. A start tag begins with a code (after the leading angled bracket) indicating a tag type. An end tag consists of that same, code, preceded by a forward slash.

In the example above, the leading "A" in the start tag indicates that it is an "anchor" tag—the type of tag that defines a hyperlink. The start tag contains a tag "attribute," indicating a target specification:

HREF="HTTP://www.microsoft.com/upgrades".

In concept, the target of a hyperlink can be virtually any type of object—including executable programs, text or multimedia documents, sound clips, audio segments, still images, computers, directories, and other hyperlinks. In WWW documents, hyperlink targets are most often files that can reside on any computers connected to the Internet. However, a hyperlink target can also be a particular location within a document, including the document that is currently being rendered.

Hypertext usage is not limited to the Internet. Various multimedia applications utilize hypertext to allow users to navigate through different pieces of information content. For instance, an encyclopedia program might use hyperlinks to provide cross-references to related articles within an electronic encyclopedia. The same program might also use hyperlinks to specify remote information resources such as WWW documents located on different computers.

Today, there is a convergence in some respects of the content available on traditional cable and broadcast TV and the content provided over the Internet. There is an increasing number of TV- and movie-related Web sites. For instance, computer users can access a CNN Web site for recent news in addition to, or in lieu of, tuning their televisions to the CNN channel. Computer users can browse through an ESPN Web site for sports information, or through a Web site from Universal Studios for facts on latest movie releases. Recently, Microsoft Corporation and NBC Studios formed a joint venture to produce a 24-hour news program with supporting Web site.

Despite the convergence of subject matter, the Internet and TV have remained somewhat separate, particularly in viewer's minds. A viewer watches the programs on his/her TV and then, to access the Internet, switches to a computer to browse Web sites for any related content.

The inventors have developed a better way of integrating supplemental content, be it on the Internet or elsewhere, with conventional TV and movie programs.

SUMMARY OF THE INVENTION

This invention concerns integrating hyperlinks into an electronic programming guide (EPG) used in an interactive entertainment system. The system includes a program provider which distributes video content programs to multiple subscribers over a distribution network (e.g., cable, telephone, broadcast, etc.). Each subscriber has a user interface unit in the form of a set-top box or computing unit which receives the digital video program and converts it for display on a television or other display unit.

The user interface unit has a processor and memory. The EPG resides in the memory and is executable on the processor to organize programming information that is descriptive of programs supplied over the interactive entertainment system. The EPG supports a user interface (UI) which visually correlates programs titles to scheduled viewing times. One UI arrangement consists of a grid having program tiles arranged horizontally beside corresponding channel tiles and vertically beneath a continuous time line that is delineated by periodic time increments, such as half-hour intervals.

A hyperlink browser also resides in memory and is executable on the processor. One or more hyperlinks, which reference target resources containing interactive supplemental content related to the programs, are displayed within the EPG UI. The hyperlinks can be placed in the program tiles, channel tiles, or description area, and can be situated alone or embedded within other text. When a viewer activates a hyperlink from the EPG UI, the user interface unit launches the browser to activate the target resource specified by the hyperlink. The data retrieved from the target resource is then displayed on the display unit.

By integrating the hyperlinks within the EPG UI, the viewer can readily identify supplemental information to the programs and access that information directly from the EPG. The viewer no longer needs to remember that there may be a Web site associated with a particular program or channel, nor is the viewer relegated to surfing the Internet from a separate machine to find any related content.

According to another aspect of this invention, the user interface unit employs an operating system which supports drag-and-drop functionality. While reviewing available programs in the EPG, the viewer can drag a particular program or channel label from its location within the EPG UI and drop the label at another location on the display unit. The operating system associates an instruction with the label that will execute in response to activation of the label to tune the visually display unit to the program or channel represented by the particular label. In this manner, the viewer can simply activate the label to return to a particular channel or program, even if the EPG is not active. If the program is not yet playing, the shortcut might further include instructions to activate any related target resource, such as an associated Web page, or to initiate procedures to record the program when it begins playing.

BRIEF DESCRIPTION OF THE DRAWINGS

FIG. 1 is a diagrammatic illustration of an interactive entertainment system according to one implementation. The FIG. 1 implementation is representative of an interactive TV system.

FIG. 2 is a simplified example of data fields in a data structure maintained by an electronic programming guide.

FIG. 3 is a diagrammatic illustration of an interactive entertainment system according to a second implementation, which is representative of an interactive integrated PC-TV system.

DETAILED DESCRIPTION OF THE PREFERRED EMBODIMENT

Figure 4:
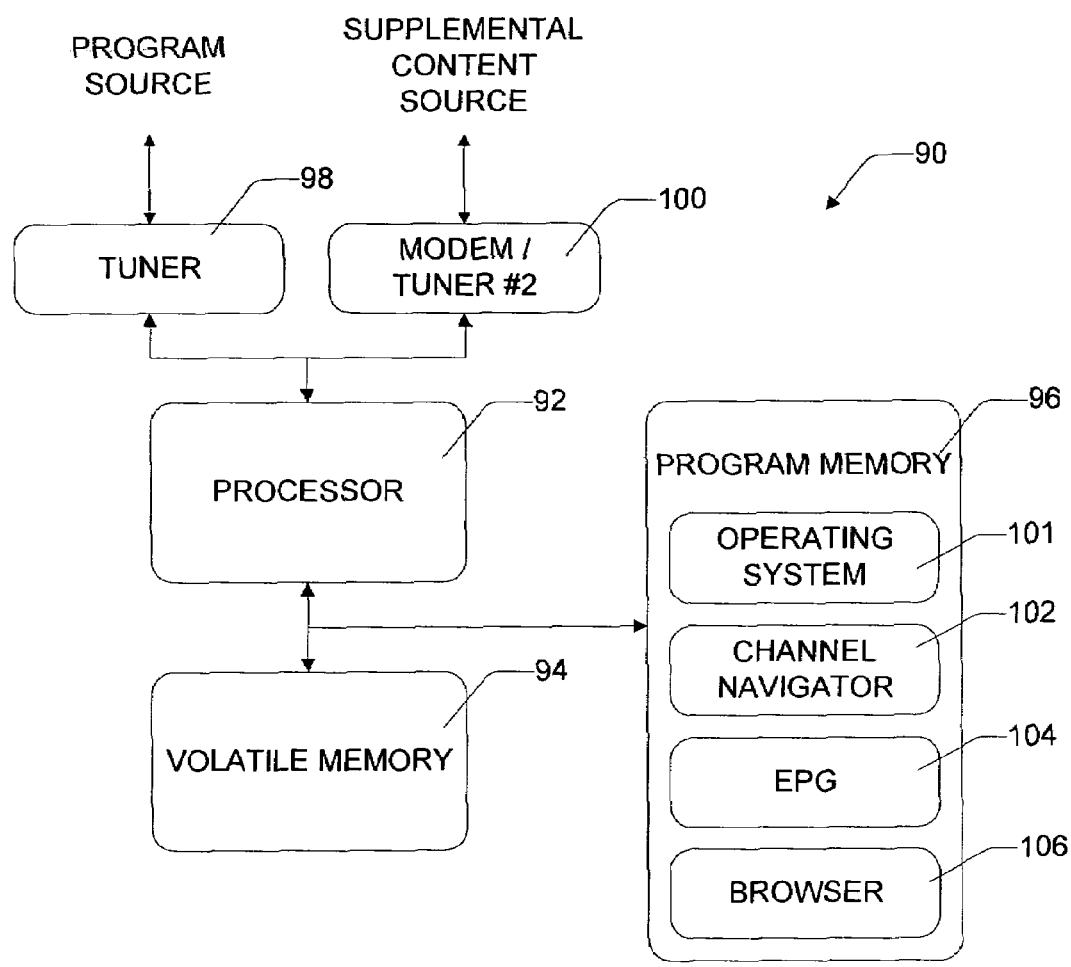
FIG. 4 is a block diagram of a user interface unit according to an aspect of this invention.

FIG. 1 shows an interactive entertainment system 20 implemented as an interactive television (ITV) system. System 20 includes a centralized headend 22 which is configured to provide continuous video content programs to multiple subscribers. Programs provided by headend 22 might include traditional broadcast TV shows, on-demand movies and games, and other services such as those commonly provided in the past by on-line computer services. A single headend might service 250,000 or more subscribers.

Each subscriber has a user interface unit 24. In the illustrated implementation, the user interface unit is embodied as a set-top box (STB) 26 coupled to a television (TV) 28. The STB 26 receives digital video signals from headend 22 and controls which programs are displayed on the TV 28. The STB 26 is controlled by the viewer through use of a panel control located on its face, or a hand held remote control unit 30. Instead of a separate STB, however, a user interface unit can be incorporated in the TV itself. In addition to televisions, the user interface unit might be implemented with other types of visual display units, such as a computer monitor. Furthermore, as is described below with respect to the FIG. 3 implementation, the user interface unit might be implemented as a computer having tuner equipment installed therein to receive the video data.

Each user interface unit 24 is configured to run an electronic program guide (EPG). The EPG provides an on-screen listing of various programs or program titles. The listing is organized in a predetermined arrangement that is displayed on the television. The EPG might also include other descriptive information, including whether the program is provided in closed caption, stereo, or alternate audio tracks, or is rated.

Headend 22 is interconnected to the subscribers via a distribution structure or network 32. The distribution structure 32 can be implemented in different ways. One implementation is a multi-tier network which includes a high-speed, high-bandwidth fiber optic cable network between the headend and regional distribution nodes (not shown), and conventional home entry lines, such as twisted-pair lines or coaxial cable, between the distribution nodes and user interface units. As an example, each distribution node might support approximately 1000-2000 user interface units. Other implementations include satellite communications (e.g., DSS technologies), RF communication, or other wireless technologies. Moreover, there network can be constructed using a combination of wireless and wire-based technologies.

In the illustrated implementation, the network 32 provides both the pipeline for distribution of programs from the headend to the subscriber, as well as a back channel which enables communication from the subscriber to the headend. The back channel permits the viewer to send requests and instructions to the headend to facilitate interactive control. The back channel might also be implemented using a different network, as is described in the FIG. 3 implementation, and the separate network might be based on a wired technology, a wireless technology, or a combination of the two.

Headend 22 provides video content programs to the user interface unit 24. The programs are embodied as video data streams that are transmitted from headend 22 over distribution structure 32 to the user interface unit. The headend maintains a database of programs 40, such as feature-length movies, past TV shows, or games, that can be requested by viewers and played to them individually in an on-demand mode. The headend can also retransmit to its subscribers broadcast video signals that it receives from another source, such as a satellite feed or another cable system. The video data streams are sent to the user interface units in digital or analog format.

Headend 22 includes a continuous media server 42 which distributes the digital video data streams kept on the programs database 40. The continuous media server and video program database are preferably implemented as a disk array data storage system consisting of many large capacity storage disks. The video data streams of the movies are stored digitally on the storage disks in predetermined or mapped locations. The locations of the video data streams are kept in a memory map and each video data stream can be accessed through pointers to the particular memory location. The continuous media server can service simultaneous requests to view a movie on demand (even the same movie) from many viewers.

An EPG server 44 is also provided at headend 22 to serve the programming information needed by the EPG at the user interface unit 24. The EPG server 44 is implemented as a structured query language (SQL) database 46 with records containing information relating to available shows or programs.

FIG. 2 shows an example data structure 48 for organizing programming information within the EPG database 46. The data structure includes various data fields 50 for holding programming information. The data fields contain program titles, actor names, whether the program has closed captioning or stereo audio, the scheduled time of the program, the network name, and description text. The data structure 48 also holds pointers to locations within the storage subsystem of the continuous media server 42 which identify storage locations of the video data streams of the programs corresponding to the program records.

With reference again to FIG. 1, the headend 22 further includes an enhanced content server 52 which serves supplemental interactive content to the user interface units to enhance or supplement the video content programs served by the continuous media server 42. The supplemental content is stored digitally in database 54 and can be text, hypermedia, graphics, video, picture, sound, or other multimedia types. Examples of possible supplemental content include interactive questions or games related to the program, additional trivia on the movies or TV shows, advertisements, available merchandise or other memorabilia, Web pages to programs of similar type or starring the same actors/actresses, and so on.

As shown in FIG. 2, the data structure 48 includes a data field 58 with a target specification in the form of a pointer "CONTENT1" to the supplemental content stored at the headend. Through the data structure, the target specifications to supplemental interactive content are correlated with the programs to which they supplement. The presence of a target specification within the data field 58 indicates that the associated program is interactive and complementary content can be displayed in addition to the program itself.

It is noted that portions of the program database 40, EPG database 46, and supplemental content database 54 might additionally be cached locally at the user interface unit, or served regionally by regional servers, as opposed to keeping every piece of data at the headend. The headend downloads the relevant programming to each regional server, or directly to the user interface units in a periodic or selective manner. In this manner, the interactive functionality is handled regionally or even locally. Various optimizing techniques, such as local caching, can be employed to reduce load on the network or improve performance of the user interface units.

FIG. 3 shows an interactive entertainment system 60 according to a second implementation which accommodates third party independent service providers. Interactive entertainment system 60 includes headend 22 which supplies programs and supplemental content to a user interface unit 62. In this implementation, the user interface unit 62 is implemented as a computer 64 with a monitor 66, a central processing unit 68, a keyboard 70, and a mouse 72 (although other input devices can be used in addition to, or instead of, the keyboard and mouse, such as a hand held remote control unit with a pointing device).

The headend 22 serves the programs over a first network 74, which may be implemented like the fiber optic distribution structure described above, or as a satellite system or other wireless broadcast system, or as a conventional data network. The video data can be transmitted using both analog and digital transmission formats. In the context of this invention, the terms "visual display unit", "display unit", or "display" are not limited to any form or type of receiver, nor to any type of distribution network or transmission format.

The interactive entertainment system 60 also includes an independent service provider (ISP) 80 which distributes digital content to the user interface unit 62 over a second network 82. An example of the second network 82 is a public network, such as the Internet. The ISP 80 has an ISP host 84 and a content database 86 to serve various multimedia content to the user. For instance, the ISP host 84 might store one or more target resources (such as a Web page) that can be rendered by the user interface unit 62.

According to this FIG. 3 arrangement, the user interface unit 62 receives traditional and on-demand programs from the headend 22, and supplemental interactive content from either the headend 22 or from an independent service provider 80. The back channel for facilitating interactive control is provided through either network 74 or 82. The off-site supplemental information provided by the ISP is correlated with the programs within the program records data structure 48 in EPG server 44. As shown in FIG. 2, the data field 58 includes target specifications to supplemental content provided by other servers. IN the illustrated example, the programs Seinfeld and Star Trek have associated supplemental content provided by ISP which are located by the hyperlink URLs in corresponding data field 58.

FIG. 4 shows a user interface unit, referenced generally as numeral 90, in more detail. The user interface unit 90 includes a processor 92, a volatile memory 94, and a program memory 96. The user interface unit 90 also has at least one receiver, and possibly two receivers, for receiving the video streams from the headend and the digital supplemental data from the headend or ISP. The first receiver is in the form of a tuner 98 which tunes to the channel or broadcast frequency to receive a video data stream from a program source, such as the headend or other program provider. The second receiver, referenced generally as 100, can be a second tuner for receiving the content over a cable or wireless distribution network, or a modem for receiving the supplemental content over the Internet or other data network.

The viewer computer runs an operating system 101 which supports multiple applications. The operating system 101 is stored in memory and executes on the processor. The operating system is preferably a multitasking operating system which allows simultaneous execution of multiple applications. The operating system 101 employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®. However, other operating systems which provide windowing environments may be employed, such as the Macintosh operating system from Apple Computer, Inc. and the OS/2 operating system from IBM.

A channel navigator application 102 is stored in program memory 96 and executes on the processor 92 to control the tuner(s) 98 and 100 to select a desired channel for receiving the video content programs. An EPG application 104 is stored in program memory 96 and executes on the processor 92 to organize programming information downloaded from the EPG server at the headend. The EPG 104 supports a displayable user interface (UI) which visually correlates programs titles to scheduled viewing times and tuning information, such as a channel, as will be described below with reference to FIG. 5. The user interface unit 90 also has a browser 106 which is kept in memory 96 and dynamically loaded on processor 92 when needed to render content, such as a hypertext document, from an ISP or other content provider. The browser can be implemented as a hyperlink browser, or more particularly, as an Internet Web browser.

Figure 5:
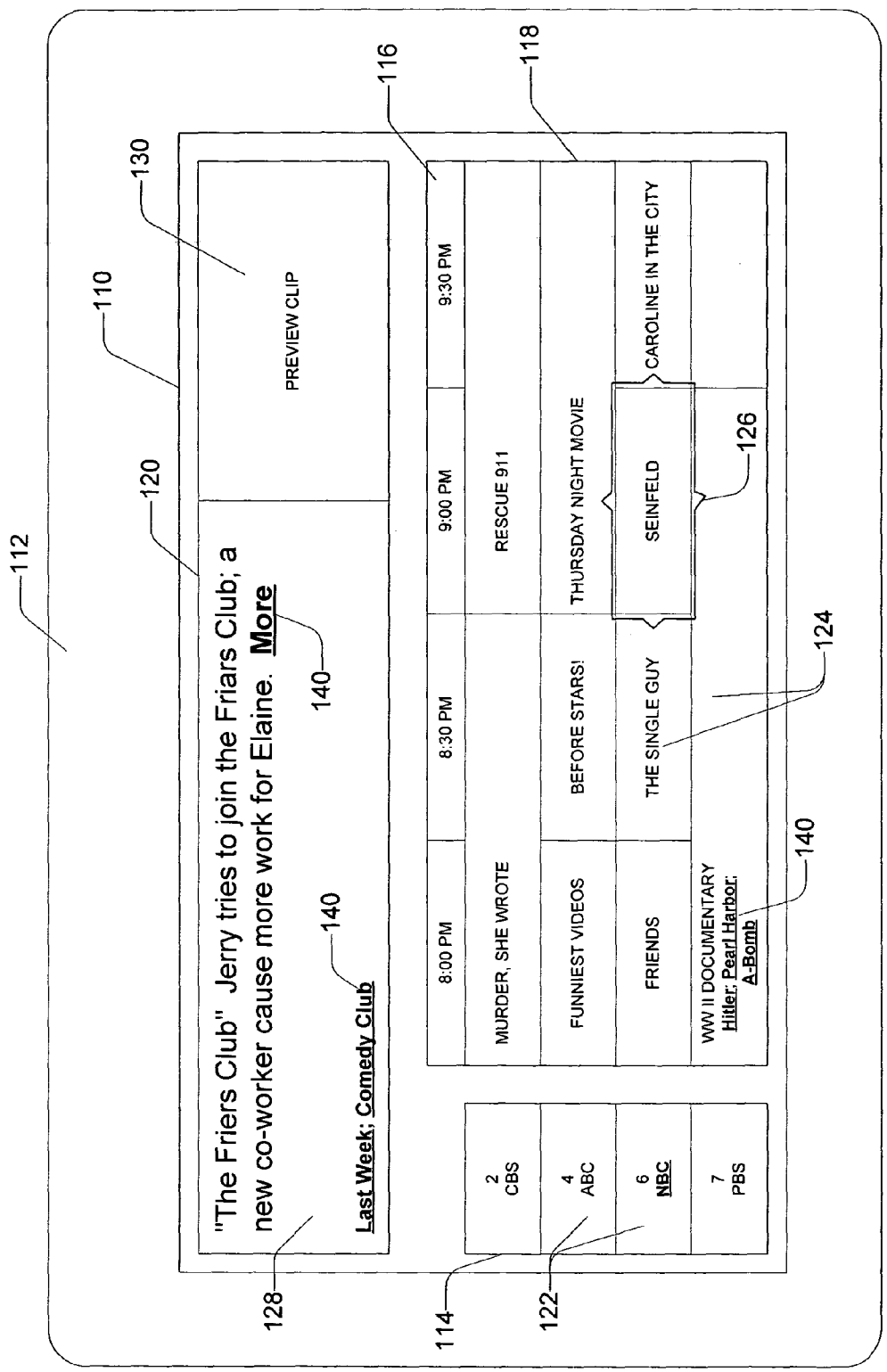
FIG. 5 is an exemplary screen illustration of an EPG user interface (UI) having hyperlinks.

FIG. 5 shows an example EPG UI 110 which is presented on a display 112. The EPG UI 110 includes a channel panel 114, a time panel 116, a program grid 118, and a program summary panel 120. Channel panel 114 provides a vertical scrolling list which displays four channel tiles 122 at any one time. Each channel tile 122 includes a channel number and a channel name (typically the network name, such as CBS and ABC), and might also include a channel logo. The channel panel 114 defines four rows of program titles in program grid 118. Time panel 116 is a horizontal scrolling continuous time line with markings denoting half-hour time segments. Time panel 116 defines columns in program grid 118.

Program grid 118 consists of multiple program tiles 124 organized in channel-based y-axis and time-based x-axis. The grid is located to the right of channel panel 114 and below time panel 116. Each program tile 124 has the program title and any secondary program descriptive information, such as closed caption, stereo, etc. The illustrated screen shows an example programming line-up for 8:00 p.m. to 10:00 p.m. PST, Thursday, Mar. 7, 1996. The program titles, such as "Murder, She Wrote" and "Friends," are arranged horizontally with respect to their networks CBS and NBC and vertically with respect to their start times of 8:00 p.m. PST.

The viewer controls the program selection with a single focus frame 126 which is graphically overlaid on the program grid 118. Focus frame 126 can be moved up or down, or left and right within a channel line-up, to choose a desired program. A remote control handset, a touch control panel, keyboard, mouse, or other manipulating mechanism can be used to position the focus frame 126 within the EPG UI.

Program summary panel 120 includes a text description window 128 and a preview window 130. The text description window 128 displays program information related to the program that is highlighted by the focus frame 126 in program grid 118. Here, the NBC program "Seinfeld" is highlighted and the text description window 128 lists the program title "Seinfeld," and a program description of the current episode. The text description window 128 might also include other program related information like closed-captioning, stereo, etc. The preview window 130 is used to display clips of the selected highlighted show.

The data to fill the various tiles and windows is supplied by the headend 22 from the EPG server 44. The data maintained in data structure 48 (FIG. 2) is transmitted as program records to the user interface unit and cached in local memory. Data records for upcoming programs can be downloaded on a periodic basis, or alternatively, individual data records for certain programs and channels can be selectively transmitted in response to viewer requests. The EPG 104 inserts the appropriate data records into the EPG UI for display as the viewer maneuvers the focus frame 126 around the grid.

The EPG UI 110 also includes hyperlinks 140 integrated as part of the grid. The hyperlinks are supplied with the program records received from the headend 22. These hyperlinks can be inserted into the channel tiles 122, program tiles 124, or the description window 128. In the FIG. 5 illustration, the hyperlink "More" is provided in the description window 128 to reference target resources that contain additional information about this episode of the Seinfeld show. Other hyperlinks in the description window 128 include "Last Week" which references a target resource containing information on the previous week episode, and "comedy club" which links to a target resource having video coverage of comedian Jerry Seinfeld performing at night clubs. The target resources referenced by the hyperlinks might be located at the headend (FIG. 1 implementation), or at an independent service provider (FIG. 3 implementation). The target resource might further be located locally, having been pre-cached by the system. For instance, the system might pre-cache supplemental information about certain shows before they air based on predictive viewing tendencies, or as part of a promotional data broadcast advertising the show. This permits local interactive functionality between the viewer and the viewer computing unit, in addition to full network interactive functionality between the viewer and the program provider.

A hyperlink "NBC" appears in the program tile 122 to provide access to an NBC web site. Hyperlinks are also show embedded in the program tiles 124, as represented by links "Hitler," "Pearl Harbor," and "A-Bomb" to additional material on World War II to supplement the documentary being shown on PBS.

The viewer activates a selected hyperlink by clicking on it (via a cursor or other indicator which may the same as or separate from the focus frame 126). If the hyperlink references materials from the headend, the user interface unit sends a request containing the target specification over the network to the enhanced content server 52. The enhanced content is located at the enhanced content server 52 and transmitted from the headend back over the network to the requesting user interface unit.

If the hyperlink references a target resource from an ISP, such as a hypermedia document in the form of a Web page or the like, the user interface unit launches the browser 106 to render the hypermedia target resource. The hypertext document is retrieved over a separate network, such as the Internet, and supplied to the user interface unit.

The EPG 104 supports other on-screen display formats besides the format shown in FIG. 5. For instance, the EPG might group program titles according to their content, such as sports or dramas. Alternatively, the EPG might group titles according to the viewer's preference. In addition, the EPG UI might also include independent or small groupings of program or channel labels that are presented on the screen at various times. At one instance, the EPG UI might include a set of labels in a toolbar-like appearance. At another, instance, the EPG UI might consist of a single small logo representing a program which is exposed in the corner of the screen during display of that program. Activation of the logo jumps the user to a Web site or other target resource in the middle of the Seinfeld program.

The EPG can also be configured to use techniques other than, or in addition to, scrolling to locate the desired program title. One example technique is to provide for key word searching that allows the viewer to identify a particular show. Once identified, the EPG would immediately display the relevant program grid pertaining to that show.

Figure 6:
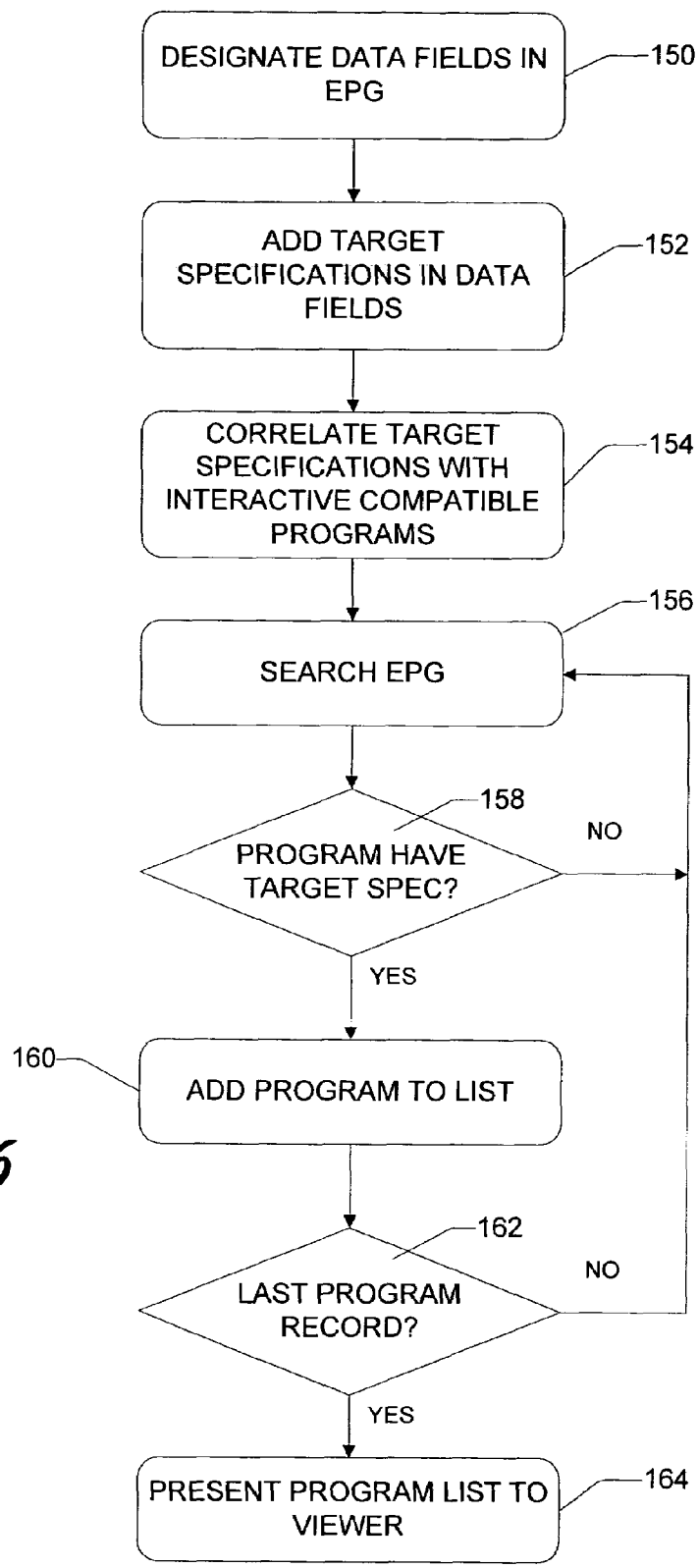
FIG. 6 is a flow chart of a method for creating an EPG data structure.

The EPG can also perform a search to locate interactive programs. FIG. 6 shows a method for constructing an EPG data structure and subsequently operating the EPG to search and locate interactive programs. Steps 150-154 concern the development of the EPG data structure 48 shown in FIG. 2. Separate data fields 50 for holding programming information are designated in the EPG structure (step 150). One of the data fields 58 is dedicated to storing target specifications to supplemental content. The target specifications can be in the form of memory pointers, hyperlinks, URLs, or any other designation for referencing a location containing supplemental content.

For programs with no supplemental content, the target specifications data field remains empty. However, for those programs with supplemental content, the target specification to the target resource containing the supplemental content is entered in the data field 58 (step 152) and correlated with the program (step 154). The correlation is provided through the data structure by the placing the target specification within the same data record as the program title and other information for a particular program.

At step 156, the processor searches the local EPG data records to find interactive programs. A program is considered interactive if an associated target specification is present in the data field 58 (step 158). If no target specification is listed (i.e., the "no" branch from step 158), the search proceeds to the next program record. If a target specification exists (i.e., the "yes" branch from step 158), the program record is added to the list of interactive programs (step 160). This process continues until the last data record is examined, as indicated by step 162. When the EPG has compiled a list of interactive programs, the list can be presented to the viewer in the EPG UI (step 164).

The viewer computer permits a viewer to enter other target specifications in addition to those provided by the content provider. For instance, suppose the viewer enjoys watching sports on an all sports network, such as ESPN. In addition to the target specifications to any ESPN-sponsored target resource, the viewer might wish to add a target specification to a target resource sponsored by his/her favorite magazine, such as Sports Illustrated. The processor presents a dialog window which enables the viewer to enter additional target specifications (such as URLs) and associate them with a particular program or channel.

If a program or channel has more than one target specification associated with it, the viewer computer can be configured to prioritize the target specifications according to the viewer's preferences. For example, suppose that the channel NBC has target resources containing content for dramas, movies, sitcoms, soap operas, sports, news, and so on. The viewer is interested primarily in sports. The viewer computer prioritizes the target specifications to the resources so that the sports target specification is the default for activation of the NBC channel label. In this manner, activation of the NBC channel label leads directly to the target resources for NBC sports. The prioritizing process can be accomplished using viewer intervention (e.g., using a dialog window to enable a viewer to prioritize a list of target specifications), or automatically by monitoring the viewer's usage pattern of the target specifications (e.g., counting hits on each target specification and prioritizing based upon this hit count).

Figure 7:
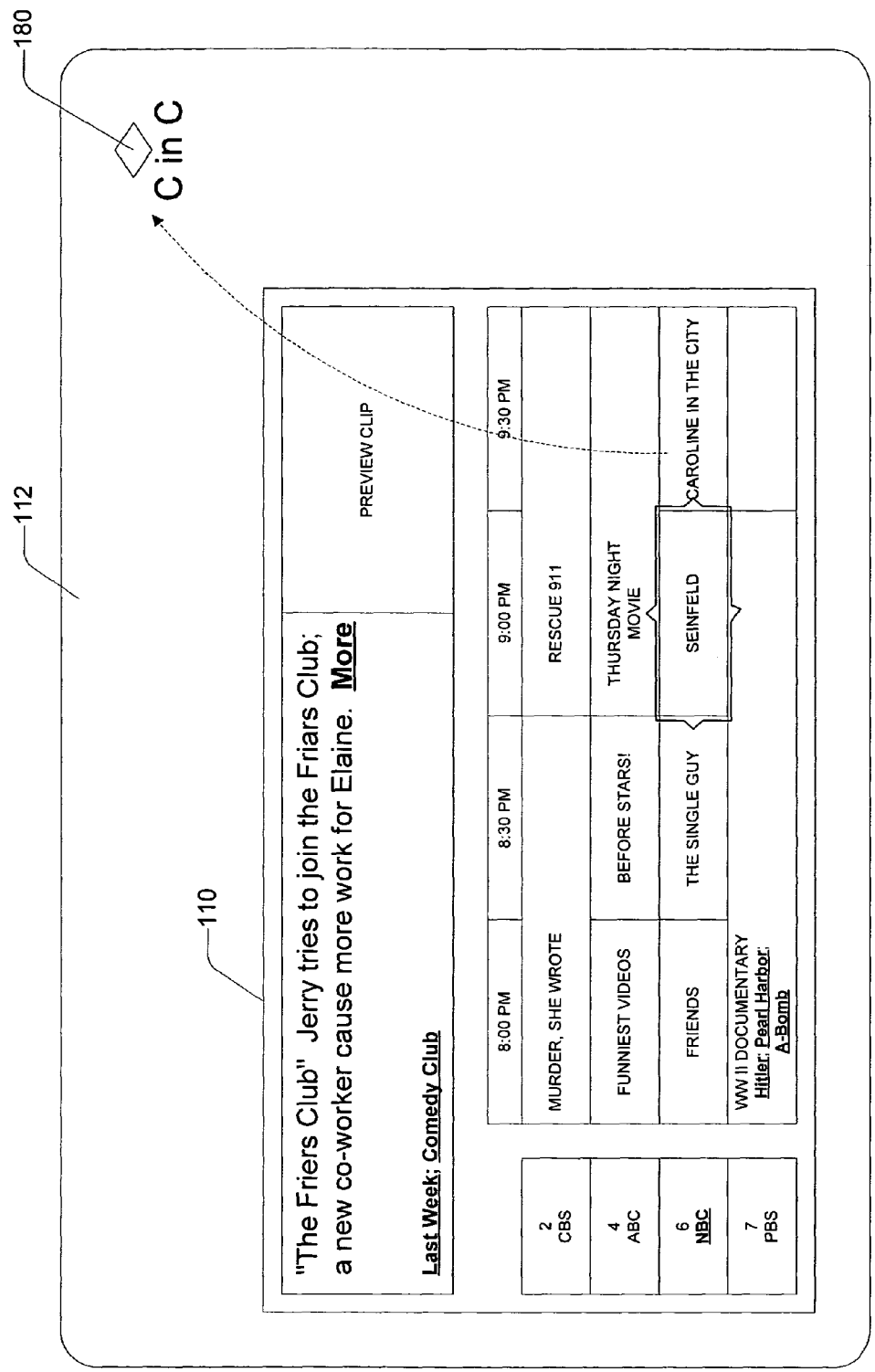
FIG. 7 is identical to FIG. 5, but further illustrates a drag-and-drop operation according to an aspect of this invention.
Figure 8:
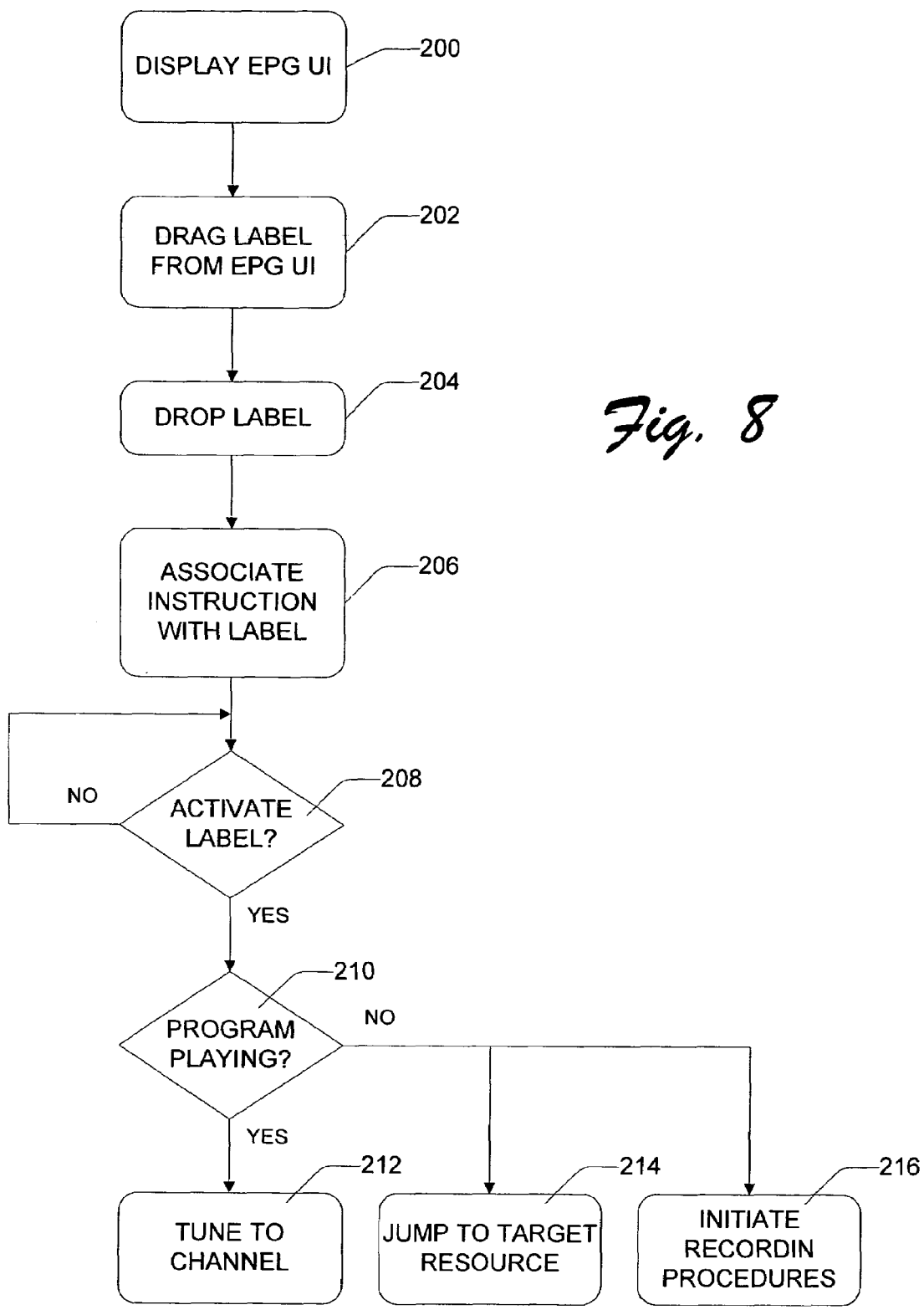
FIG. 8 is a flow chart of a method for operating an EPG.

Another aspect of this invention concerns an efficient method for creating shortcuts to a particular show or channel using a drag-and-drop operation. This method is described with reference to FIG. 7, which shows the same EPG UI 110 on display 112 as is illustrated in FIG. 5, and to the flow diagram of FIG. 8.

For purposes of explaining the process, consider the following example in which a viewer decides to create a shortcut to a program on the NBC channel. Suppose a viewer wants to watch "Seinfeld," which begins at 9:00 PM. Until then, however, the viewer wants to use the user interface unit for other applications, like performing banking transaction, or purchasing a product, or writing a document. To create a short cut, the viewer activates the EPG UI 110 for display on the screen (step 200 in FIG. 8). Using a handset, mouse, or other tool, the viewer clicks on the program tile with the Seinfeld (title and/or logo) 180 and drags the label from the EPG UI 110 to another location on the screen (step 202 in FIG. 8). The viewer drops the Seinfeld label at an outer area of the screen (step 204 in FIG. 8). The drag-and-drop operation results in creation of an instruction that becomes associated with the Seinfeld label 180 (step 206 in FIG. 8).

The viewer can then close the EPG UI window 110 and proceed to other applications. The Seinfeld label 180 remains visible for ready access back to the NBC channel. When the viewer activates the Seinfeld label 180 (i.e., the "yes" branch from step 208), the instruction associated with the label directs the user interface unit to perform one of three actions, depending in part upon whether the Seinfeld program is playing (step 210 in FIG. 8). If it is, the user interface unit tunes to the NBC channel and begins showing the video content stream for "Seinfeld" (step 212 in FIG. 8).

On the other hand, suppose that the time is only 8:00 PM and the Seinfeld program is not scheduled to start for another hour. In this case (i.e., the "no" branch from step 210), the user interface unit can perform one or two operations. First, the user interface unit can invoke some code to reference a target resource having information on the Seinfeld program (step 214 in FIG. 8). For instance, the instruction might call for invoking the Web browser 106 to render an NBC Web page for information on "Seinfeld." A second operation might be to initiate a routine which will record the program "Seinfeld" when the program begins playing at 9:00 PM (step 216 in FIG. 8).

The instruction created during the drag-and-drop procedure might also be configured to automatically tune to the program at the start time of the program, without any viewer initiation. For instance, the reminder created by dragging the Seinfeld label from the EPG UI causes the display unit to tune automatically to the appropriate channel (e.g., NBC) at the start time of 9:00 PM for the Seinfeld program. The EPG maintains a time of day clock to know when the programs start. Alternatively, the instruction might entail automatic tuning to the appropriate channel to record the program beginning at its start time.

The drag and drop aspects described above are preferably implemented using object linking and embedding (OLE), which is commercially available from Microsoft Corporation. OLE is an extensible service architecture built on the Component Object Model (COM) which is both language independent and location independent. OLE supports an OLE Drag and Drop which is widely used in Windows®-compatible operating systems, such as Windows® 95. OLE and COM have been well documented and will not be explained in detail. For more information regarding OLE and COM, refer to *OLE 2 Programmer's Reference* and *Inside OLE 2, Second Edition*, both published by Microsoft Press of Redmond, Wash., and both of which are hereby incorporated by reference.

It is noted that the viewer can also create shortcuts to the channels themselves, rather than to a particular program. The viewer clicks on the channel tile with a channel label (title, network name, and/or logo), drags the channel label from the EPG UI 110, and drops it at another location on the screen. The drag-and-drop operation results in creation of an instruction to tune the visual display unit to the channel upon activation of the channel label. For more information on short cuts, refer to pending U.S. patent application Ser. No. 08/526,314 entitled "Method and System for Providing Internet Shortcuts", which was filed on Sep. 11, 1995, and is assigned to Microsoft Corporation. This application is hereby incorporated by reference.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

The invention claimed is:

1. A user interface unit comprising:
   a processor;
   an electronic programming guide (EPG) executing on the processor to:
   organize programming information, including correlating Internet universal resource locators (URLs) with particular programs in the EPG, the URLs identifying target resources that contain supplemental information related to the particular programs; and enable a user of the user interface to enter additional URLs identifying target resources that contain supplemental information related to the particular program, wherein the user associates the user entered additional URLs identifying target resources with a particular program or channel in the EPG, wherein the associated additional URLs are prioritized and displayed within an EPG Field associated with the particular program within the EPG, wherein prioritizing the associated additional URLs comprises monitoring the user's usage pattern of the associated additional URLs; and the processor being programmed to search the EPG and identify the particular programs having correlated URLs as interactive programs.

2. A user interface unit as recited in claim 1, further comprising a visual display, the processor being programmed to compile a list of the interactive programs and present the list of interactive programs on the visual display.

3. A tangible computer-readable medium encoded with computer-executable instructions configured for:

designating data fields in an electronic programming guide (EPG) to hold programming information;

dedicating one of the data fields as a supplemental content field;

entering a plurality target specifications into the supplemental content field to correlate supplemental content with a program, the target specification identifying a location for the supplemental content, wherein the entering a target specification into the supplemental content field comprises receiving the target specification from a viewer accessing an EPG user interface (UI) supported by the EPG, wherein the plurality of target specifications is prioritized and displayed within a supplemental content field associated with the program within the EPG, wherein prioritizing the plurality of target specifications comprises monitoring the viewer's usage pattern of the target specification;

associating, by the viewer, the target specification identifying a location for the supplemental content with a particular program or channel in the EPG;

compiling a list of interactive programs, wherein each interactive program in the list is a program having an associated target specification; and presenting the list of interactive programs through the EPG user interface (UI) supported by the EPG.

4. A tangible computer-readable medium encoded with computer-executable instructions as recited in claim 3, wherein the compiling comprises searching the EPG for interactive programs.

5. A tangible computer-readable medium encoded with computer-executable instructions as recited in claim 3, wherein the target specification is selected from the group comprising:

a memory pointer;

a hyperlink; and a universal resource locator (URL).

6. In a system having an electronic programming guide (EPG), a method comprising:

correlating user entered hyperlinks with corresponding programming information in the EPG, wherein the user enters the hyperlinks through an EPG user interface (UI) supported by the EPG and associates the hyperlink with a particular program or channel in the EPG, wherein the entered hyperlinks are displayed within an EPG Field associated with the particular program or channel within the EPG, wherein prioritizing the entered hyperlinks comprises monitoring the user's usage pattern of the hyperlinks; and searching the EPG to identify interactive programs within the programming information that have correlated hyperlinks.

\* \* \* \* \*

UNITED STATES PATENT AND TRADEMARK OFFICE
CERTIFICATE OF CORRECTION

| | | |
|---|---|---|
| PATENT NO. | : 7,665,109 B2 | Page 1 of 1 |
| APPLICATION NO. | : 10/620254 | |
| DATED | : February 16, 2010 | |
| INVENTOR(S) | : Joseph H. Matthews, III et al. | |

It is certified that error appears in the above-identified patent and that said Letters Patent is hereby corrected as shown below:

On Title page 3, Item (56), under "Other Publications" column 2, line 24, below "mailed on Aug. 12, 2008, 10pp." insert -- Connolly, Hypertext Markup Language-2.0, RFC 1866. November 1995, MIT/W3C. --.

Signed and Sealed this

First Day of February, 2011

David J. Kappos
*Director of the United States Patent and Trademark Office*